(12) United States Patent
Wirth

(10) Patent No.: US 10,811,995 B2
(45) Date of Patent: Oct. 20, 2020

(54) CLAMPED QUASI-RESONANT STEP-UP INVERTER

(71) Applicant: ARCFLASH LABS, LLC, Los Angeles, CA (US)

(72) Inventor: David Morgan Wirth, San Diego, CA (US)

(73) Assignee: Arcflash Labs, LLC, Los Angeles, CA (US)

( * ) Notice: Subject to any disclaimer, the term of this patent is extended or adjusted under 35 U.S.C. 154(b) by 0 days.

(21) Appl. No.: 16/513,647

(22) Filed: Jul. 16, 2019

(65) Prior Publication Data

US 2020/0036294 A1 Jan. 30, 2020

Related U.S. Application Data

(60) Provisional application No. 62/702,907, filed on Jul. 25, 2018.

(51) Int. Cl.
*H02M 7/5383* (2007.01)
*H02M 7/538* (2007.01)
*H02M 7/48* (2007.01)

(52) U.S. Cl.
CPC ......... *H02M 7/538* (2013.01); *H02M 7/4807* (2013.01); *H02M 7/5383* (2013.01)

(58) Field of Classification Search
CPC ............. H02M 7/538; H02M 7/53803; H02M 7/53806; H02M 7/5383
See application file for complete search history.

(56) References Cited

U.S. PATENT DOCUMENTS

| 2,783,384 | A | | 2/1957 | Bright |
| 2,915,710 | A | | 12/1959 | Schiewe |
| 2,950,446 | A | | 8/1960 | Humez, Jr. |
| 3,818,314 | A | | 6/1974 | Miller |
| 4,270,163 | A | | 5/1981 | Baker |
| 4,344,122 | A | * | 8/1982 | Jones ................. H02M 3/3388 331/113 A |
| 5,657,220 | A | * | 8/1997 | Yan ...................... H02M 7/539 363/132 |
| 10,177,662 | B2 | * | 1/2019 | Taniguchi ............... H02M 1/14 |

OTHER PUBLICATIONS

Dickinson, D., 2008, "Flyback controller charges any size capacitor", Analog Devices.

(Continued)

*Primary Examiner* — Gary L Laxton
(74) *Attorney, Agent, or Firm* — Knobbe, Martens, Olson & Bear LLP

(57) ABSTRACT

A device which, through its self-oscillation, generates a stable high voltage DC or AC output from a low voltage DC input. The device automatically maintains a desired voltage on an output capacitor, despite changes in output load or input voltage. The device is capable of dead-short operation, capacitor charging, high voltage step-up, high efficiency, and high power density. The capability to step up low voltage to high voltage in such a manner paves the way for advancement in battery-to-grid inverter technology, portable welding devices, portable medical devices, aircraft and spacecraft propulsion devices among many other areas.

13 Claims, 6 Drawing Sheets

(56) References Cited

OTHER PUBLICATIONS

Hapidin, D. A., Saleh, I., Munir, M. M., and Khairurrijal, 2017, "Design and Development of a Series-Configuration Mazzilli Zero Voltage Switching Flyback Converter as a High-Voltage Power Supply for Needleless Electrospinning", Procedia Engineering, Engineering Physics International Conference, 170 pp. 509-515.

McClusky, S. L., "High Voltage Resonant Self-Tracking Current-Fed Converter", Thesis, Mar. 2010., California Polytechnic State University, San Luis Obispo, CA, pp. 46-60.

* cited by examiner

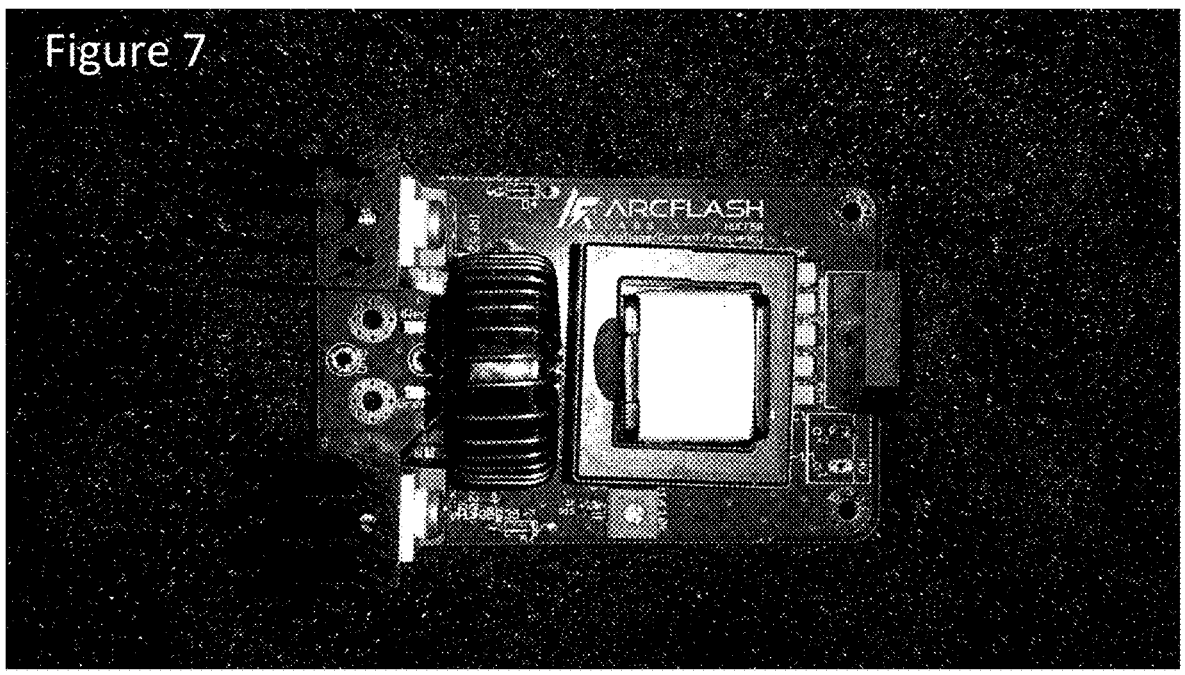
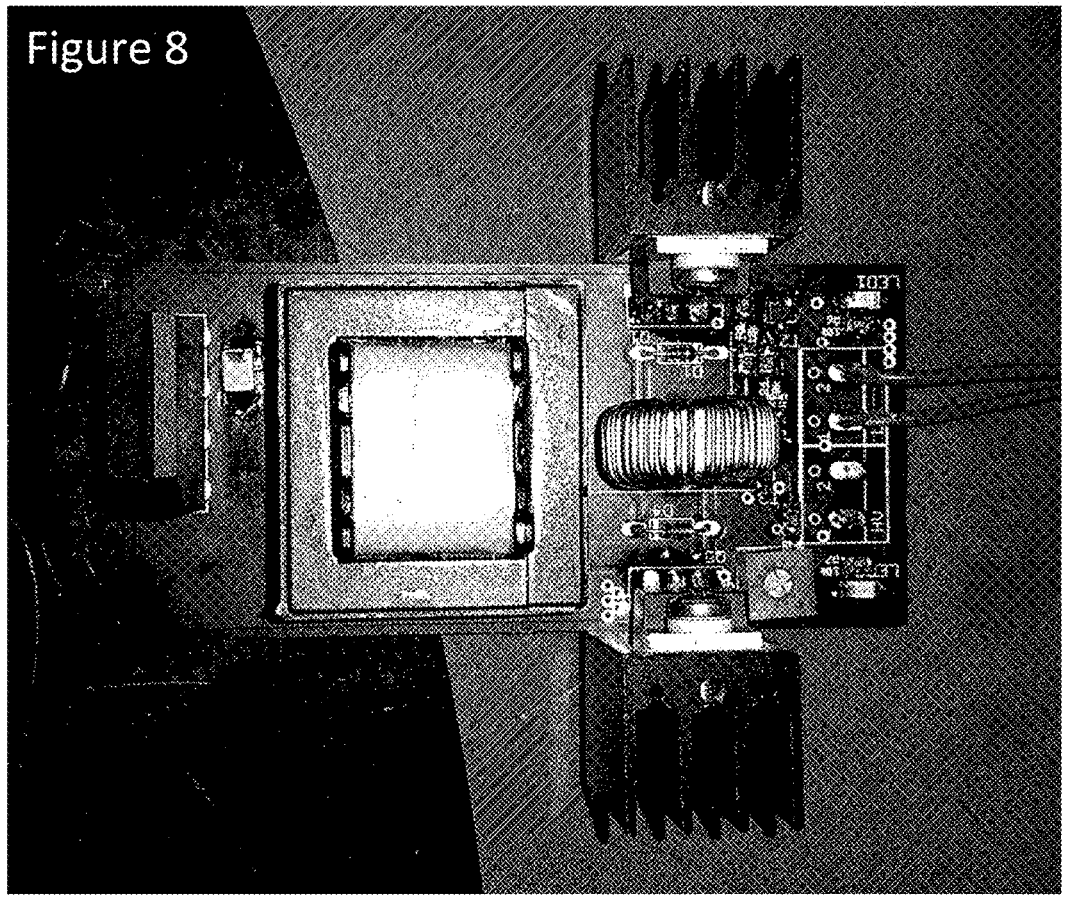

CLAMPED QUASI-RESONANT STEP-UP INVERTER

BACKGROUND

The present invention is a device which converts low voltage DC to high voltage DC through the action of a self-oscillating system of discrete semiconductors and passive components.

Systems for converting low voltage DC into high voltage DC or high voltage AC have come under especially high demand in recent years due to the proliferation and advancement of Lithium battery technology. This revolution in low voltage, high amperage energy storage technology has generated a great deal of applications. Unfortunately, advancements in power conversion technologies have not kept pace with advances in batteries. Transformer technology has been virtually stagnant since the early $20^{th}$ century when laminated core transformers permeated the market. Simultaneously, demand for high voltage, high amperage systems has only increased: motors such as those used in air conditioning equipment, electric cars, and many household appliances run off AC and at voltages too high to be effectively stored in lithium ion batteries, thus contributing to the load on power grids. Furthermore, technologies which would benefit greatly from portable high voltage such as welders, medical devices, electrostatic motors, induction motors and spacecraft propulsions systems (among many others) have been greatly limited by the size and weight of power conversion systems necessary to step up low voltage from batteries to the high voltage required to run such systems at the high amperage required. Therefore, a technology gap has opened between the heavily researched fields of low voltage battery storage and high voltage energy consuming devices.

The current method for converting low voltage DC into high voltage AC is through the use of an inverter. Modern commercial inverters generally convert 12 or 24 VDC at high amperage to 120 or 240 VAC with one or multiple phases. Current inverter technologies average 5 W/in^3 for a 24V to 120 VAC step up and are generally optimized to only run at one frequency.

In 2014, Google and IEEE announced the LittleBox challenge with the goal of increasing the watt-density of inverter technology to at least 50 W/in^3. This challenge was completed in 2016 by CE+T Power who achieved a record-setting power density of 145.24 W/in^3, however their inverter was only equipped to step DOWN voltage from 300-450 VDC to 240 VAC and necessitated the use of expensive GaN power semiconductor devices. In the field of conventional step UP inverters, progress has been incremental and to this date, it is rare to find step UP inverters with power densities above 10 W/in^3.

The primary challenge to design of high power density step up inverters is related to the efficiencies of ferrite core materials at mains frequencies (50-60 Hz), necessitating the use of large transformers in order to step battery voltage up to AC at the required output frequency. Due to saturation effects, physics and materials science, this necessitates the use of larger (and therefore heavier) cores in higher power transformers to avoid saturation (which results in dramatically reduced efficiency and heating of the core).

The present invention eschews this problem in favor of an alternate solution which is not dependent on advances in materials science: change the frequency to take advantage of smaller transformers, store the energy as high voltage DC, then use a second power switching stage to convert the DC into AC at the desired frequency. While this design, a so-called "hybrid inverter", is considerably more complex than traditional step up inverters, it has a number of distinct advantages:

Firstly, such an inverter can be made considerably smaller than traditional designs. Since the core magnetic permeability is frequency dependent for most materials, this allows for higher amperages to be drawn from smaller cores at high frequencies. The ability to digitally select a desired frequency on demand within a very wide range—anywhere from 500 kHz to 50 Hz is extremely useful and lends itself well to applications in portable welders and electric spacecraft propulsion systems. Finally, the ability to produce high voltage DC and AC from the same system lends itself to portable welding systems or capacitor charging systems for the defense industry among many others.

None of these advantages are specific to the Clamped Quasi-Resonant (CQR) topology described by the current work, but I describe the advantages of the broader class of Hybrid Inverters, to which the novel CQR type belongs.

The CQR inverter described in the current work expands upon traditional hybrid inverters by its simplicity and intrinsic output voltage clamping. It can intrinsically handle large currents with high volumetric power density, and a stable output voltage by adjusting its resonant frequency with input voltage to fully take advantage of the frequency dependent nature of magnetic permeability in transformer cores.

One of the properties unique to the CQR topology is the exploitation of an effect known as $\Delta$VC (Voltage Coefficient of Capacitance) unique to the Class II dielectric materials used in Multi-Layer Ceramic Capacitors (MLCC's). This effect acts to reduce the effective capacitance of a capacitor as its bias is increased. Such a property can be exploited to automatically increase the oscillation frequency of a transformer primary when it is energized with higher voltage, thereby preventing the transformer from entering saturation. While such variations in primary frequency could also easily be accomplished by a digital or analog control system, such a system adds a considerable amount of complexity and cost and may be subjected to electromagnetic interference especially when used in high power systems, thereby reducing its reliability.

Such a topology is in contrast with much of the prior art. Many ZVS topologies, such as the resonant Royer and Mazzilli topologies focus mainly on simplicity over control and are inherently limited due to their inability to precisely control output voltage. In the Royer oscillator, its oscillation frequency is largely fixed at the resonant frequency of the circuit elements. And in the Mazzilli topology its oscillation frequency is load-dependent. In the CQR topology, the oscillation frequency is dependent on both the load (due to load mirroring, similar to the Mazzilli) and input voltage (due to $\Delta$VC of the MLCC tank capacitors).

BRIEF DESCRIPTION OF THE DRAWINGS

FIG. 7—This photograph shows an embodiment of the present invention

FIG. 8—This photograph shows an alternate embodiment of the present invention which was improved upon to develop the current embodiment shown in FIG. 7.

DETAILED DESCRIPTION

The invention consists of an oscillating system similar in design to the "Resonant Royer Oscillator" as first espoused in U.S. Pat. No. 3,818,314. This design was modified and optimized for use in a DC-DC step up application and the fundamental schematic of the current invention is shown in FIG. 1.

Figure 1:
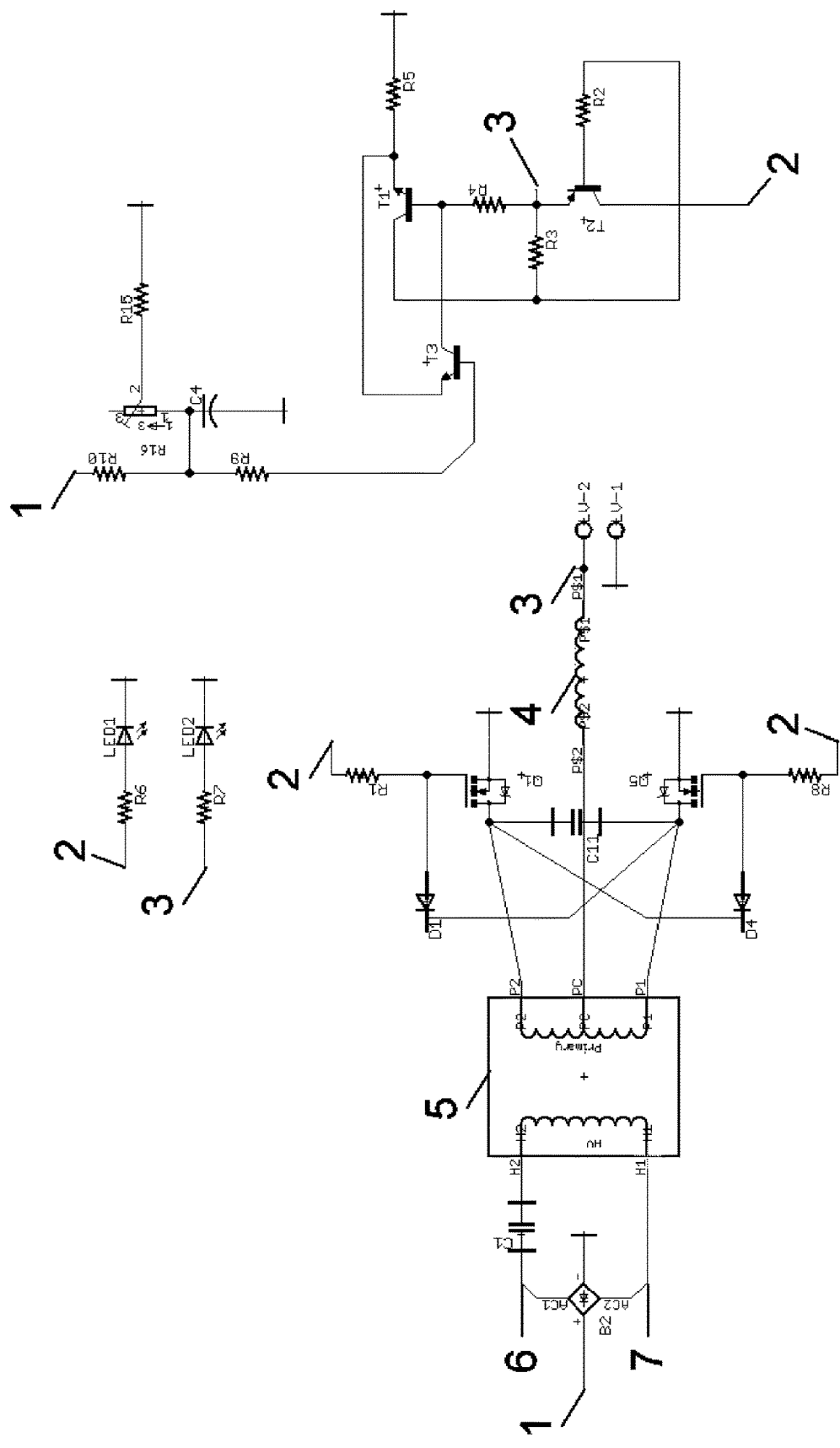
FIG. 1—This schematic depicts the layout connections within a Clamped Quasi-Resonant Inverter as built and demonstrated. showing: (1) output electrical power, (2) Gate drive signal, (3) input electrical power, (4) Primary Inductor, (5) Transformer, (6) and (7) Isolated AC output.

The invention shown in FIG. 1 represents the core components of the Clamped Quasi-Resonant Inverter (CQR). The CQR consists of a number of systems: the oscillator, the clamp, the switches, the transformer, and the rectifier. LED2 indicates the presence of power to the unit, and LED1 indicates that the switching is activated.

In an embodiment of the present invention, the oscillator consists of a system similar to that depicted on the right hand side of FIG. 1, complimenting the resonant characteristics of the transformer, switches, inductor and tank capacitors shown in the center. The primary purpose of the oscillating mechanism is to activate one of the two switches, Q1 or Q5 at a time, in resonance with the natural driving frequency of the transformer 5. This resonance frequency is automatically adjusted by the $\Delta VC$ of the tank capacitor C11 along with the primary of the transformer forming an L-C circuit. In an embodiment, the tank capacitor is of MLCC type with Class II dielectric with a (0V bias) nominal capacitance in the range of 10 nF to 10 µF. In an alternate embodiment, the tank capacitor may be film type with a (0V bias) nominal capacitance in the range of 10 nF to 10 µF, although such an embodiment may be less efficient under some operating conditions.

The oscillating mechanism is modulated by a voltage divider, consisting of resistors R10, R16, and R9. This voltage divider senses the voltage at the output of a bridge rectifier B2. When the output voltage exceeds a desired level, current begins to flow through an NPN bipolar junction transistor T3, relieving the voltage at the base of a similar NPN bipolar junction transistor T1, and allowing current to bypass T1 and flow directly through a low value resistor R5. In an embodiment of the present invention, resistor R5 has a value between 10-100 Ohms. This stops the oscillation of the system and pulls the gates of power transistors, Q1 and Q5 to ground. In an embodiment of the present invention, transistors Q1 and Q5 are Field Effect Transistors (FETs). Since the source of input voltage, 3 is supplied through the center tap (PC) on transformer 5 and both transistors Q1 and Q5 are shut down, current ceases to flow through the system.

The clamp's operation relies on the simple action of a voltage divider, which is amplified by the means of the gain on a transistor's base. When the voltage of the divider fed by the high voltage output 1 exceeds a certain level, the clamping mechanism shuts down the oscillator. The clamp performs its function through the following procedure: power is supplied to the low voltage input 3 where the current passes through the primary inductor 4 and into the center tap (PC) of the transformer 5. Simultaneously, current flows through resistors R3 and R4. This turns on the base of transistor T1 which also pulls down the base of PNP transistor T2, allowing a current to flow into the gates of Q1 and Q5. Due to miniscule differences in the structure of the oscillating switches Q1 and Q5 and miniscule differences in the resistance of R1 and R8, one of the two FETs will turn on slightly faster than the other, allowing for current to begin flowing through one FET first. In an alternate embodiment of the present invention, this asymmetry can be assisted by adding a resistor between the gate and source of transistor Q1 to induce a discrepancy between the transistors Q1 and Q5. This action immediately pulls down the gate of the opposing transistor through the gate diodes D1 or D4. A resonating system is created by the action of the power transistors Q1 and Q5, the tank capacitor C11 and the primary inductor 4. This oscillation continues until the desired output voltage at 1 is reached or the low voltage source 3 current is removed.

The desired output voltage is clamped by setting a variable resistor R16 between the value of resistor R9 and zero ohms, using the resistance of R15 as a backstop to prevent the resistance to ground from reaching zero. In one embodiment of the present invention, resistor R16 is an analog potentiometer having a resistance range between 0-10,000 Ohms and resistor R9 is a surface mount or through hole resistor having a resistance of 10,000 Ohms. In one embodiment of the present invention, resistor R10 is a surface mount or through hole high voltage resistor having a resistance of 1,000,000 Ohms. In an alternate embodiment of the present invention, R10 is a series of lower value resistors having a combined resistance in the neighborhood of 1,000,000 Ohms. In alternate embodiments of the invention, resistor values of R16, R9, and R10 may be scaled down or up proportionally, or adjusted individually to achieve the desired clamping behavior.

Capacitor C4 is a smoothing capacitor designed to filter out high frequency noise from the output stage 1 and prevent undue effect on the sensitive base of transistor T3. In one embodiment of the present invention, capacitor C4 is a surface mount multi-layer ceramic capacitor having a capacitance of between 0.01 and 10 micro-Farads (µF) and a voltage rating of over 5V. In alternate embodiments, the capacitor C4 may be of film, electrolytic, tantalum, polymer or electric double layer type, or any other future type of capacitor having a capacitance of 0.01-10 µF and a voltage rating over 5V. In alternate embodiments of the invention, an alternate method of hysteresis may be employed using a Schmidt trigger, comparator or other system of transistors, inductors, discrete integrated circuits and/or microcontrollers to passively or actively feed back the output voltage into the logic which controls the primary side oscillating system thereby shutting down or varying the oscillation frequency of the power transistors to control the ultimate output voltage on the secondary side.

In one embodiment of the present invention, transistors T1 and T3 are of type bipolar NPN with a V_ce between 20 and 150V, and maximum collector current rating between 100 mA and 20 A. In an embodiment of the present invention, transistors T1 and T3 are Diodes Incorporated part number ZXTN19100CFFTA. In one embodiment of the present invention, transistor T2 is of type PNP with a voltage rating between V_ce between −20 and −150V, and a maximum collector current rating between −50 mA and −10 A. In an embodiment of the present invention, transistor T2 is a Diodes Incorporated part number ZXTP19100CFFTA.

The power transistors Q1 and Q5 in the present invention are shown as N-Channel Metal On Silicon Field Effect Transistors (MOSFETs). They are high current-rated standard level FETs designed to pass at least 50 A of current through their Drain and Source during normal operation. Their gate charge must be sufficiently low so as to allow the delicate oscillator and clamping circuit to actuate the FETs at frequencies up to 100 kHz. Their reverse breakdown voltage must be sufficient to allow for spikes of up to 2× the input voltage (3) to be switched without causing breakdown of the FETs. The gates of the switches are connected to diodes D1 and D4 as well as resistors R1 and R8. The function of the resistors is to limit the inrush and outrush current to the switch gates. The function of the diodes is to facilitate oscillation as described above.

In one embodiment of the present invention, diodes D1 and D4 are general purpose silicon rectifier diodes with a reverse breakdown voltage of between 100-1000V and a forward current between 50 mA and 10 A. In one embodiment of the present invention, such diodes are of type 1N4148 general purpose rectifier diodes. In an alternate embodiment of the present invention, diodes D1 and D4 are Schottky diodes with reverse breakdown 50-250V and forward current rating between 50 mA and 10 A. In an alternate embodiment of the present invention, diodes are of type Schottky part number SL110PL-TP. This is in contrast to the popular Mazzilli ZVS circuit which uses Zener diodes with a reverse (Zener) breakdown voltage of 10-20V. In the present invention, such diodes are NOT designed to conduct current in their reverse direction and their breakdown voltage should be sufficient to prevent reverse breakdown.

In an embodiment of the present invention, gate resistors R1 and R8 are of similar values between 100-1000 Ohms. In an alternate embodiment of the present invention, resistors R1 and R8 are of different values slightly offset by 10-250 Ohms such to facilitate the system's oscillation at higher frequencies necessitating higher current to the power transistors' Q1 and Q5 gates. In an embodiment of the present invention, resistors R1 and R8 are surface mount resistors both rated at 330 Ohms.

In one embodiment of the present invention, power transistors Q1 and Q5 are of N-channel type FETs and have a minimum drain to source breakdown voltage of Vds>50V, and a pulsed drain current over 40 A. In one embodiment of the present invention, such FETs have total Qg below 110 nC. In one embodiment of the present invention, such FETs are Texas Instruments CSD19505KCS 80 V N-Channel NexFET Power MOSFETs. In an embodiment, such FETs are affixed to heatsinks. In an alternate embodiment, the FETs are of DPAK, D2PAK or other surface mount package and are configured to dissipate heat through the internal and/or external copper layers of the printed circuit board substrate.

The transformer 5 is a critical component of the system. Its size, form factor, inductance and turns ration are all critical to the function of the present invention. In an embodiment of the present invention, the transformer consists of a 4:4:150 turn IE-type ferrite core transformer with a center tap (PC) on the primary winding. It also possesses two connections to the beginning and end of the primary winding (hereafter referred to Primary Tap 1, P1 and Primary Tap 2, P2); Tap P1 is connected to the drain of Q1 and Tap P2 is connected to the drain of Q5. Its center tap, PC is connected to inductor (4). The transformer must have sufficiently high gauge wire so as to pass at least 40 A of current through the primary when operating at its design frequency of 30-100 kHz. The transformer must be sufficiently isolated to prevent internal arcing between the layers. In an embodiment of the present invention, the transformer is HI-POT insulated to at least 1500V RMS for at least 60 s at 1 MHz. The secondary side of the transformer is connected to the rectifier B2 with a decoupling capacitor C1 between one of the AC poles of the rectifier and the secondary winding of the transformer as shown in FIG. 1. In an embodiment of the present invention, the inductance of the secondary winding is between 4-12 mH. In an embodiment of the present invention, the effective length of transformer core is between 15-75 mm. In an embodiment of the present invention, the core material is ferrite. In an alternate embodiment, the core material is Carbonyl SF. In an alternate embodiment, the core material is Permalloy. In an alternate embodiment, the core material is Sendust. In an alternate embodiment, the core material is laminated silicon-steel sheets. In an alternate embodiment, the transformer is air-cored. In an alternate embodiment, the transformer is cored with a ferromagnetic, paramagnetic, diamagnetic, dielectric or conductive material or combination of dielectric, conductive, ferromagnetic or diamagnetic or paramagnetic material(s) such as in a planar transformer. In an embodiment, the transformer is square or rectangular in shape. In an alternate embodiment, the transformer is circular or of an oblong circular-rhombus shape. In an embodiment, the transformer is sintered from a ceramic powder. In an embodiment, the windings are made from copper. In an embodiment, the insulation between the windings is polyimide or fluorocarbon based. In an embodiment, the insulation is PVC-based.

Figure 2:
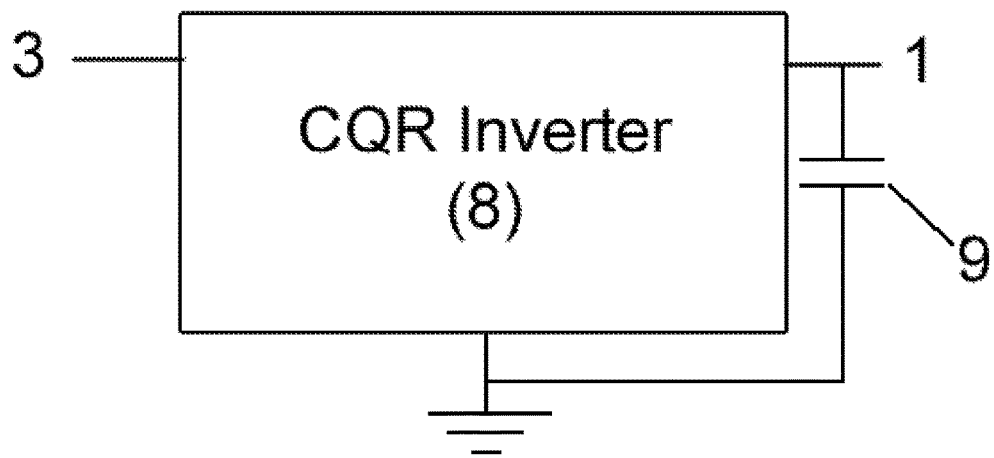
FIG. 2—This drawing depicts a notional layout of a higher level structure which can be constructed using the Clamped Quasi-Resonant (CQR) Inverter shown in FIG. 1, the entire system of which is depicted as (8), where (9) is an external load capacitor connected to a common ground.

The rectifier B2 in the present invention is responsible for converting the high frequency AC signal into DC which can be stored by a capacitor in the output. The rectifier as shown in FIG. 1 and output capacitor as shown in FIG. 2 are both necessary in order for the clamp to properly regulate the operation of the device. If the rectifier AND output capacitor are not present, the CQR Inverter will be constantly active, and may overheat if not properly designed. The rectifier must have a sufficiently high breakdown voltage to rectify voltages above 500V. The rectifier must be capable of passing sufficiently high current through to the output—at least 2 A. The rectifier must be capable of ultra-fast recovery so as to rectify the high frequency output of the transformer 5. The rectifier must be capable of rectifying AC at frequencies over 10 kHz.

In an embodiment of the invention, the rectifier B2 may consist of a general purpose silicon bridge rectifier in a single four pin package format. In an alternate embodiment, the rectifier may consist of two, four, or more discrete semiconductor packages. In an alternate embodiment, the rectifier may consist of an array of silicon-carbide Schottky diodes which offer ultra-fast recovery, high voltage and high amperage capabilities. In an alternate embodiment, the rectifier may consist of fast recovery general purpose silicon diodes such as 1.2 kV/8 A TO220 package diodes of part number STTH8S12D, or other fast recovery diodes with rated voltage 100V-10 kV or current above 100 mA (average rectified). In an alternate embodiment, the rectifier may be comprised of the body diodes. In an alternate embodiment, the rectification may be performed by actively switched MOSFETs, power BJTs or IGBTs. In an alternate embodiment, the rectifier may be actively or passively switched. In an embodiment of the present invention, the rectifier B2 is a general purpose bride rectifier of type KBL410-G with a 4 A/1 kV single phase rating. In an alternate embodiment of the present invention, the rectifier B2 is a bridge configuration of four discrete fast recovery diodes of type UF5408, each having a 3 A/1 kV single phase rating. In an alternate embodiment, the rectifier is of type GBU6K with a 6 A/800V single phase rating.

In an embodiment of the present invention, the primary inductor 4 has an inductance rating between 1-1000 micro-Henries (μH) with a current rating over 4 A-DC. In an embodiment of the present invention, the primary inductor is a Bourns Inc. 2300LL-Series 100 μH toroidal power inductor.

The CQR inverter itself 8 is represented in FIG. 2 as a sub-system block in a larger system. From an overarching system perspective, the CQR Inverter 8 is connected to a large load capacitance 9 which is connected to a common ground as well as the low voltage input 3—this common low voltage input ground is shown by the ground symbol in FIG. 2.

The load capacitance 9 may be any capacitive, resistive, or combination of capacitive or resistive elements in parallel or series. Inductive loads may also be possible. Assuming load 9 is a capacitive or resistive load connected between the high voltage output 1 and ground, the inverter 8 will attempt to maintain the positive terminal of load 9 at a set voltage as determined by the clamping mechanism of the individual inverter 8. This is useful in a capacitor charging application as the load capacitance 9 can be arbitrarily large.

Figure 3:
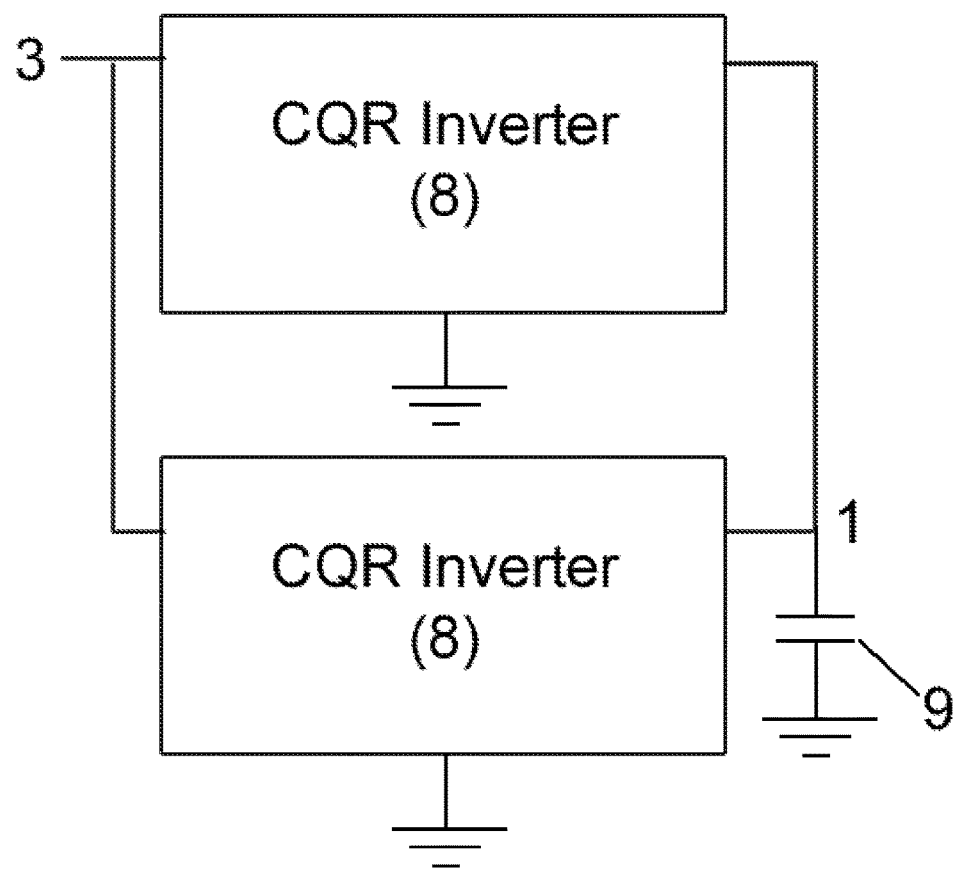
FIG. 3—This drawing depicts an alternate embodiment of the invention where two or more CQR Inverters (8) are connected in parallel to drive a larger load capacitor (9).

In an alternate embodiment of the present invention as shown in FIG. 3, two or more inverters 8 may be assembled in a parallel configuration with their inputs 3, outputs 1 and grounds tied together to drive a common load 9. In such a configuration, care must be taken to set the individual inverters' 8 clamps to the same desired voltage, to avoid powering one inverter constantly while the other sits idle. This can be accomplished manually, digitally or via analog methods. If the clamps are set properly, the load power will be effectively distributed between the two or more inverters 8, thus multiplying the output current of the overall system by the number of parallel inverters 8. Such a configuration is useful to drive very large capacitive loads such as often required in defense or aerospace applications.

Figure 4:
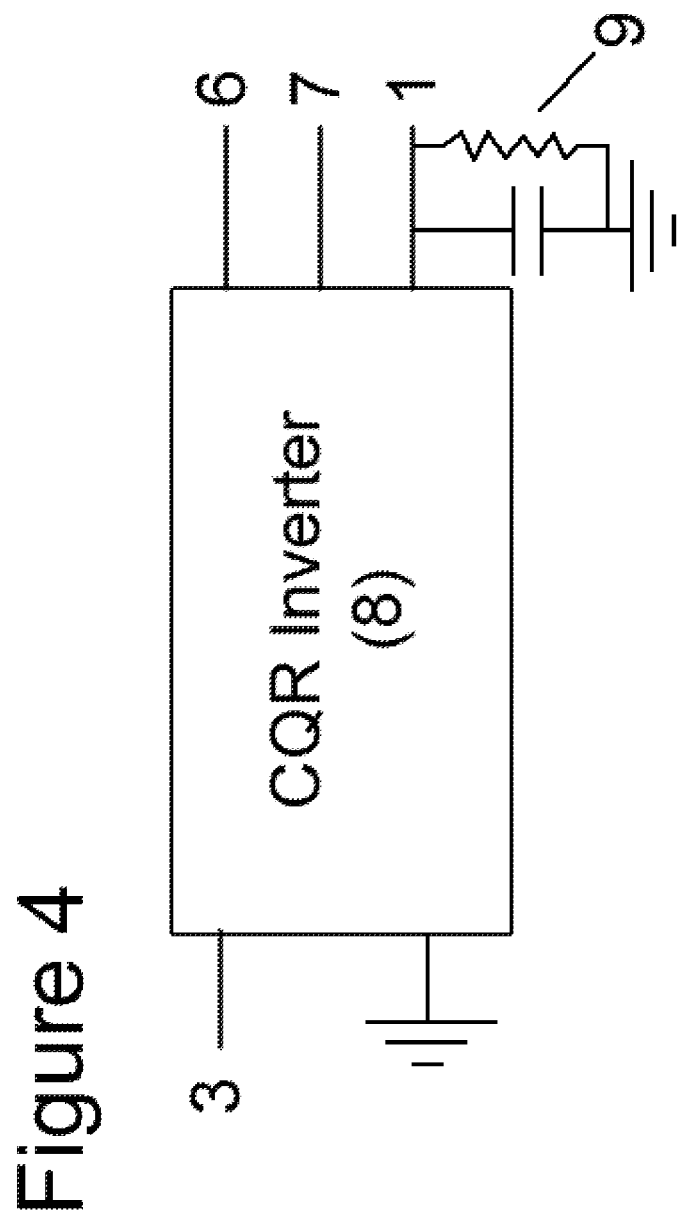
FIG. 4—This drawing depicts an alternate embodiment showing the CQR Inverter (8) outputting isolated AC from (6) and (7) with a load capacitor (9) and optional bleeder resistor connected between output electrical power (1) and common ground.

In an alternate embodiment as shown in FIG. 4, one or more CQR inverters 8 may be configured such that a load capacitance and load resistance are placed in parallel between the high voltage DC output 1 and ground. High voltage AC outputs 6 and 7 can then be tapped to provide power for a high voltage-high frequency application such as an arc welder where AC is desired and high frequency is preferable due to its ease in forming electrical arcs. In such an embodiment, the load 9 capacitance may be very small and the load resistance very large, providing an effective open circuit on the DC output, forcing all the current to flow as high frequency AC through an external load attached to AC outputs 6 and 7. In an alternate embodiment, the load 9 capacitance may be very large and the load 9 resistance used as a resistance or arc welder itself if the user desires a DC current for their welding application.

Figure 5:
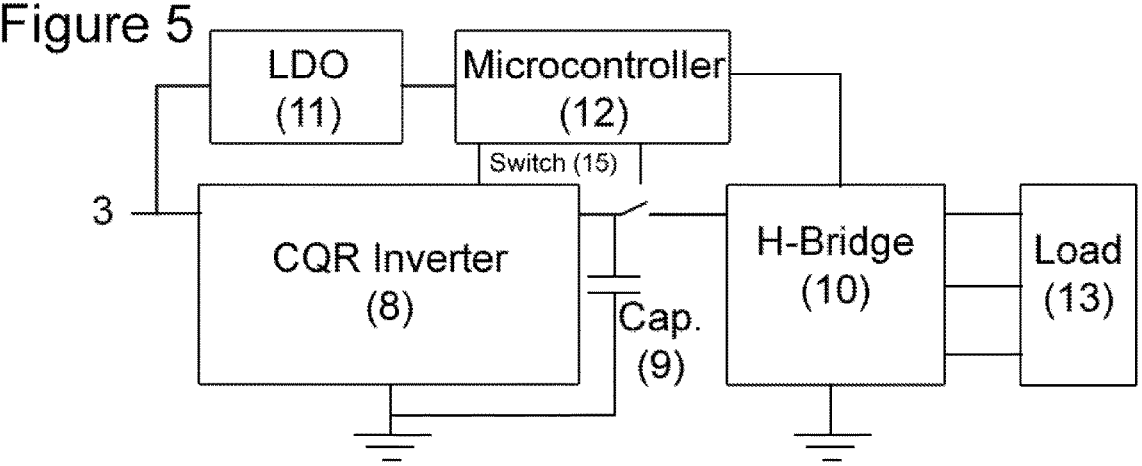
FIG. 5—This drawing depicts a higher level structure which builds upon the configuration shown in FIG. 2 and features the addition of a microcontroller (12) which controls the action of an H-Bridge (10) via a switch (15) to generate variable frequency AC or DC 2 or 3 phase output.

In yet another embodiment, FIG. 5 shows how the system may be controlled by a microcontroller 12 which is powered by an independent Low-Dropout Regulator (LDO) 11 or one of many similar regulated linear or switching power supplies known to those of ordinary skill. In an embodiment of the invention, the microcontroller may control a switch 15 which supplies current to an H-Bridge 10, depleting the charge in the capacitor 9 to drive an ultimate load 13. This simultaneously allows the H-Bridge 10 to begin inverting the DC output into AC, and signals the CQR 8 to begin charging the capacitive inverter load 9 back up to its setpoint voltage. The H-Bridge may switch DC at a desired frequency and with the desired number of phases to drive an inductive load or resistive ultimate load 13. This is especially useful in driving motors for household appliances or electric vehicles, or for coupling large DC power sources (solar-powered battery farms) to the AC power grid at a precisely defined frequency at a given phase angle as regulated by the microcontroller—this may be advantageous in the case of a grid-tie inverter. The microcontroller may also act in such a fashion as to regulate the output voltage by means of a digitally controlled potentiometer in the place of potentiometer R16.

Figure 6:
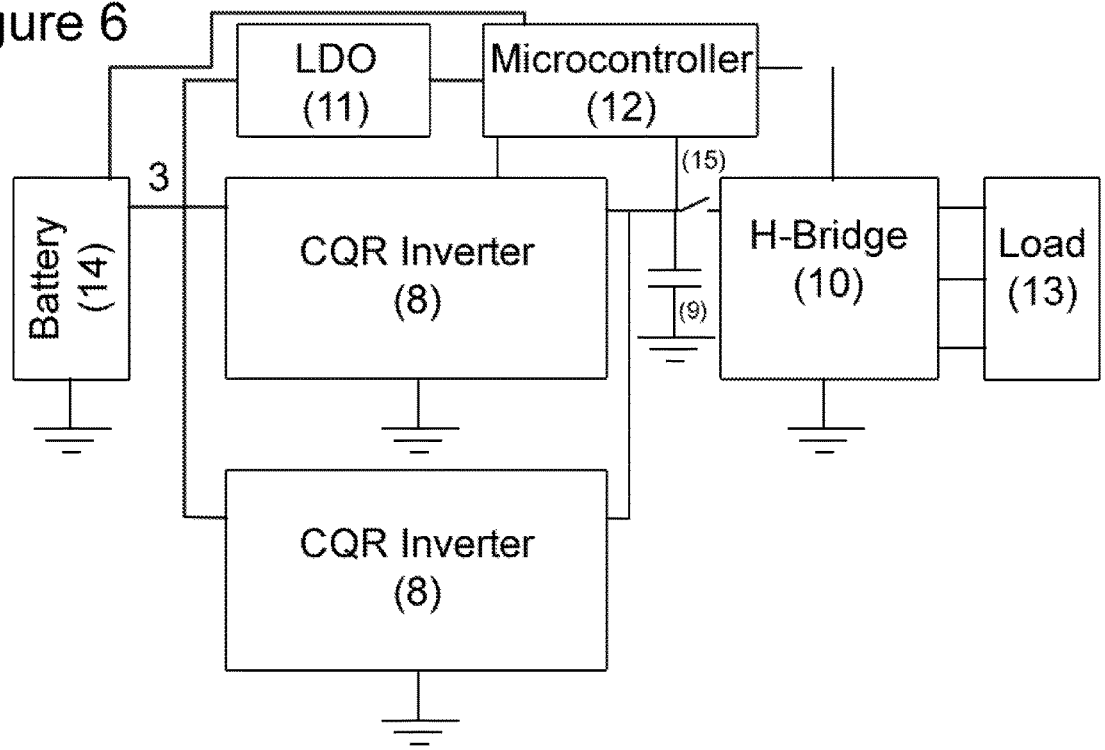
FIG. 6—This drawing depicts an alternate embodiment of the system depicted in FIG. 5 where the Low voltage DC input (3) is supplied by a battery (14) also connected to the common ground and the voltage of which is sensed by the microcontroller (12).

In another embodiment, FIG. 6 shows how the system in FIG. 5 may be connected to a battery or bank of batteries 14 such as in a solar, electric vehicle, or electric spacecraft propulsion application.

Figure 9:
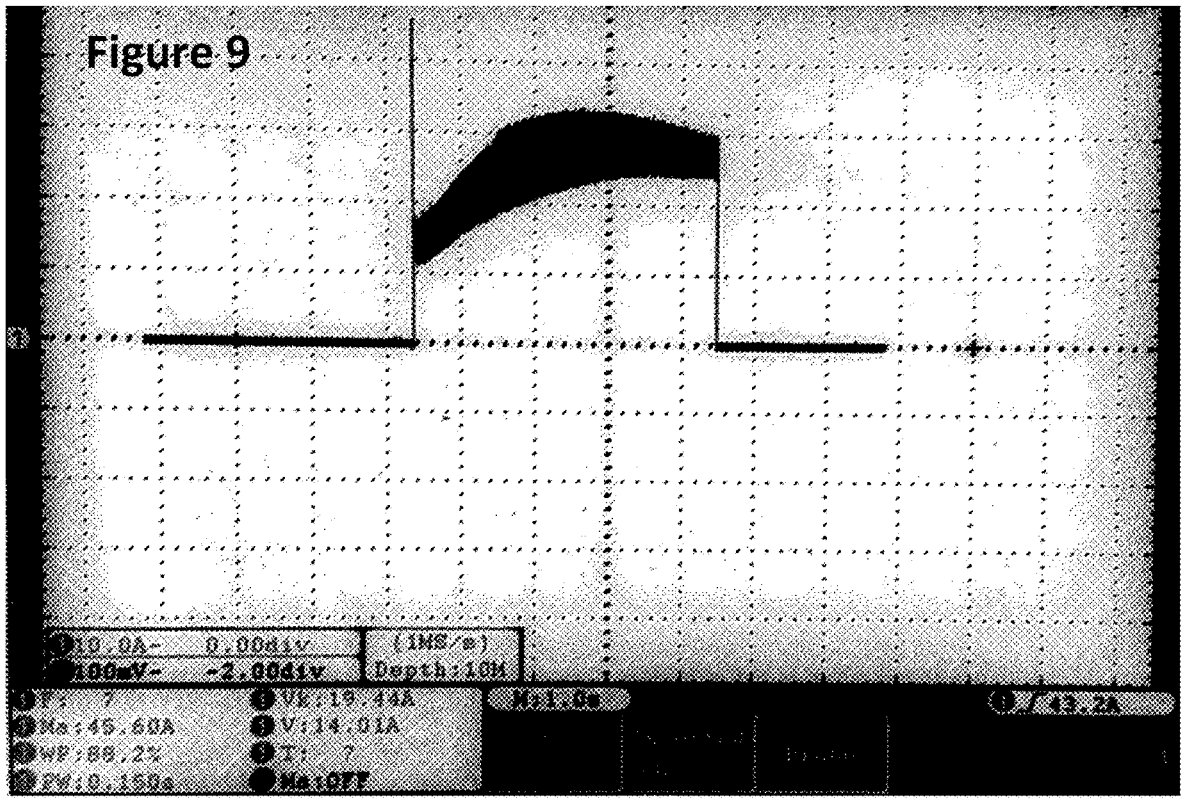
FIG. 9—This photograph shows an oscilloscope graph of the input amperage to the embodiment shown in FIG. 7 versus time.
Figure 10:
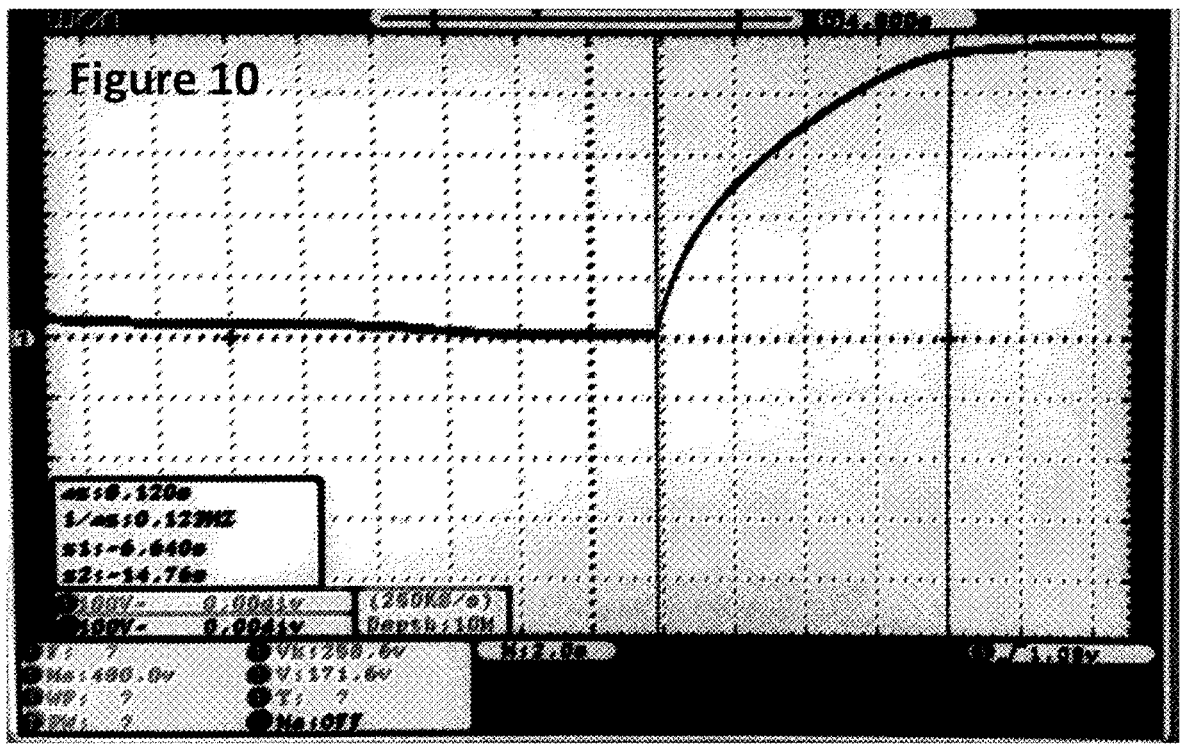
FIG. 10—This photograph shows an oscilloscope graph of the output voltage of the embodiment shown in FIG. 7 versus time.

In a current embodiment of the invention, FIG. 9 shows an oscilloscope plot obtained by connecting a 6S Lithium Polymer battery at 25.2V to the low voltage input 3 of the present invention through a 0.1 Ohm shunt resistor which was probed by the oscilloscope to obtain the graph shown in the figure. The high voltage output 1 was connected to a 12 mF, 500V rated electrolytic capacitor sharing a common ground. FIG. 10 shows an oscilloscope plot obtained by connecting a 6S Lithium Polymer battery at 25.2V to the low voltage input 3 of the present invention, and connecting the high voltage output 1 to a 12 mF, 500V rated electrolytic capacitor sharing a common ground. The oscilloscope was connected to the positive terminal of the capacitive load 9 and shared a common ground with the capacitor and battery.

The invention claimed is:

1. An apparatus which accepts an input electrical power having an input voltage and an input current and produces an output electrical power, comprising:
   a) a transformer having a primary side and a secondary side wherein the primary side is connected to the input electrical power and comprises at least three taps; a first terminal tap RPM, a second terminal tap, and a center tap;
   b) the primary side of the transformer being configured to be switched by an oscillating mechanism with a frequency that is positively correlated with the input voltage;
   c) the secondary side of the transformer coupled magnetically with and electrically insulated from the primary side;
   d) one pole of a decoupling capacitor connected to the secondary side of the transformer;
   e) a rectifier connected to the opposing pole of the decoupling capacitor, and;

f) a first pole of a load capacitor connected to the rectifier and the output electrical power, and a second pole of the load capacitor connected to ground, wherein the load capacitor's voltage correlated with a known reference is fed back into the oscillating mechanism in order to maintain a stable output voltage independent of the input voltage of the input electrical power, wherein the oscillating mechanism comprises one or more switches which are placed between each of the first and second terminal taps on the primary side of the transformer and to ground, and whereby control signals of at least one switch connected to the first terminal tap are electrically coupled to switched paths of at least one switch connected to the second terminal tap; and g) one or more diodes, each having an anode and a cathode, which are placed between the at least one switch connected to the first terminal tap and the at least one switch connected to the second terminal tap; and h) at least one tank capacitor placed between the cathodes of the one or more diodes.

2. The apparatus of claim 1, wherein the decoupling capacitor is non-polarized.

3. The apparatus of claim 1, further comprising an inductor with an inductance level between 1-500 μH connected to the center tap on the primary side of the transformer.

4. The apparatus of claim 1, wherein the transformer is designed to operate at a frequency between 1-750 kHz.

5. The apparatus of claim 1, wherein the one or more diodes are of standard P-N type, or of type Schottky, Zener, Tunnel, Step, PIN, LED or Varactor.

6. The apparatus of claim 1, wherein the at least one tank capacitor is made of multi-layer ceramic, mica, single layer ceramic, PTFE, metallized film, oil-filled, tantalum, or electrolytic material.

7. The apparatus of claim 6, wherein the at least one tank capacitor has a capacitance value which is strongly dependent upon applied voltage.

8. The apparatus of claim 1, wherein the decoupling capacitor has a capacitance value between 0.1-1000 nF.

9. The apparatus of claim 1, wherein the rectifier is a full wave type.

10. The apparatus of claim 3 wherein the inductor possesses a saturation current rating at least twice that of the transformer.

11. The apparatus of claim 9, wherein the ground is shared between the rectifier on the secondary side of the transformer and the ground on the primary side of the transformer.

12. The apparatus of claim 9, wherein the rectifier utilizes series of diodes which are of standard P-N type or type Schottky, avalanche, Zener, tunnel, step, PIN, freewheel, or varactor.

13. The apparatus of claim 12 wherein the series of diodes are capable of ultra-fast switching with a reverse recovery time of less than 100 ns.

* * * * *

UNITED STATES PATENT AND TRADEMARK OFFICE
CERTIFICATE OF CORRECTION

PATENT NO. : 10,811,995 B2  
APPLICATION NO. : 16/513647  
DATED : October 20, 2020  
INVENTOR(S) : David Morgan Wirth Page 1 of 1

It is certified that error appears in the above-identified patent and that said Letters Patent is hereby corrected as shown below:

In the Claims

In Column 8, Line 54, Claim 1, delete "taps;" and insert -- taps: --.

In Column 8, Line 55, Claim 1, delete "tap RPM," and insert -- tap, --.

In Column 9, Line 7, Claim 1, delete "power," and insert -- power; --.

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*